United States Patent [19]

Kühling et al.

[11] Patent Number: 5,314,985
[45] Date of Patent: May 24, 1994

[54] MOLTEN, CATALYTIC PROCESS FOR THE PREPARATION OF POLYCARBONATES

[75] Inventors: Steffen Kühling; Wolfgang Alewelt; Hermann Kauth; Dieter Freitag, all of Krefeld, Fed. Rep. of Germany

[73] Assignee: Bayer Aktiengesellschaft, Leverkusen, Fed. Rep. of Germany

[21] Appl. No.: 66,671

[22] Filed: May 24, 1993

[30] Foreign Application Priority Data

May 29, 1992 [DE] Fed. Rep. of Germany ....... 4217775

[51] Int. Cl.$^5$ .................................................. C08G 64/30
[52] U.S. Cl. ................................. 528/198; 528/125; 528/126; 528/171; 528/196; 528/199; 528/200
[58] Field of Search ............... 528/198, 199, 200, 196, 528/125, 126, 171

[56] References Cited

U.S. PATENT DOCUMENTS

| | | | |
|---|---|---|---|
| 3,312,662 | 4/1967 | Kurkjy et al. | 260/47 |
| 3,457,239 | 7/1969 | Stewart et al. | 260/75 |
| 3,625,920 | 12/1971 | Borkowski | 260/47 |
| 4,330,664 | 5/1982 | Brunelle | 528/198 |
| 4,782,131 | 11/1988 | Sweeny | 528/180 |
| 4,948,871 | 8/1990 | Fuknoka et al. | 528/481 |
| 5,026,817 | 6/1991 | Sakashita et al. | 528/199 |
| 5,097,002 | 3/1992 | Sakashita et al. | 528/199 |
| 5,142,018 | 8/1992 | Sakashita et al. | 528/199 |
| 5,151,491 | 9/1992 | Sakashita et al. | 528/199 |

FOREIGN PATENT DOCUMENTS

| | | |
|---|---|---|
| 360575 | 3/1990 | European Pat. Off. . |
| 529093 | 2/1992 | European Pat. Off. . |
| 1031512 | 6/1958 | Fed. Rep. of Germany . |
| 1097058 | 12/1967 | United Kingdom . |

OTHER PUBLICATIONS

Database WPI, wk 9216-AN 92-128597 & JP-A-4 072 327 (Idemitsu Petrochem KK) Mar. 6, 1992.
Database WPI, wk 8906-AN 89-044028 & JP-A-63 317 525 (Mitsui Toatsu Chem. Inc) Dec. 26, 1988.

Primary Examiner—Harold D. Anderson
Attorney, Agent, or Firm—Joseph C. Gil; Aron Preis

[57] ABSTRACT

The object of the present invention is to provide a process for the preparation of aromatic polycarbonates in the molten state using fluoride catalysts.

10 Claims, No Drawings

MOLTEN, CATALYTIC PROCESS FOR THE PREPARATION OF POLYCARBONATES

The object of the present invention is to provide a process for the preparation of aromatic polycarbonates in the molten stated from diphenols and dicarbonates and optionally chain-branchers and/or monophenols at temperatures of 100° C. to 320° C., preferably 120° C. to 300° C., and at pressures of 1 bar to 0.01 mbar, preferably 0.5 bar to 0.05 mbar, in the presence of catalysts, characterised in that the compounds used as catalysts have the general formula $M^+F_x^-$ and are used in amounts of $10^{-8}$ mol to $10^{-1}$ mol, preferably in amounts of $10^{-7}$ mol to $10^{-2}$ mol, per mole of diphenol used, where $M^+$ is a metal ion preferably an alkali metal ion, an alkaline earth metal ion, or a transition metal ion, or a quaternary ammonium ion or a quaternary phosphonium ion and x corresponds to the valency of each of the cations $M^+$.

Suitable cations are $Na^+$, $K^+$, $Rb^+$, $Cs^+$, $Ca^{2+}$, $Sr^{2+}$, $Ba^{2+}$, $N(CH_3)_4^+$ and $P(C_6H_5)_4^+$.

The preparation of aromatic oligo/polycarbonates by the fused interesterification process is known from the literature and is described in the Encyclopedia of Polymer Science, Vol. 10 (1969), Chemistry and Physics of Polycarbonates, Polymer Reviews, H. Schnell, Vol. 9, John Wiley and Sons, Inc. (1964), EP applications 338 085, 360 578, 351 168, JP-P 36-694, 36-13942, U.S. Pat. No. 4,330,664, 5,026,817 and DP 1 031 512.

In the abovementioned references and the data given there, basic alkali metal, alkaline earth metal and transition metal hydroxides, alcoholates, carbonates, acetates, boranates, hydrogen phosphates and hydrides are described as catalysts. The presence of these basic compounds in polycarbonates leads to poor hydrolytic and thermal stabilities which can only be eliminated by the addition of neutralising agents, such as are described for example in Bel.-P 677 424.

Surprisingly, it has now been found that particular metal fluorides, quaternary ammonium fluorides or phosphonium fluorides are suitable as catalysts for the fusion interesterification of an aromatic dihydroxy compound and a dicarbonate to prepare solvent-free polycarbonates. In addition, the polycarbonates prepared in this way exhibit, surprisingly, very high hydrolytic stability.

According to the invention, suitable catalysts are for example: lithium fluoride, sodium fluoride, potassium fluoride, rubidium fluoride, caesium fluoride, magnesium fluoride, calcium fluoride, barium fluoride, lead fluoride, tetramethylammonium fluoride, tetraphenylphosphonium fluoride.

The suitable catalysts according to the invention, $M^+F^-_x$, may also be used in combination with each other (two or more).

Suitable diphenols for the process according to the invention are preferably those with 6 to 30 carbon atoms, which may be mononuclear or polynuclear and may be alkyl-substituted or halogen-substituted. Examples which may be mentioned are hydroquinone, resorcinol, dihydroxydiphenylene, bis-(hydroxyphenyl)-alkanes, bis-(hydroxyphenyl)-cycloalkanes, bis-(hydroxyphenyl) sulphides, bis-(hydroxyphenyl)-ethers, bis(hydroxyphenyl)-ketones, bis-(hydroxyphenyl) sulphones, bis-(hydroxyphenyl) sulphoxides, $\alpha,\alpha'$-bis-(hydroxyphenyl)-diisopropyl-benzenes and their nuclear-alkylated or nuclear-halogenated compounds.

Preferred diphenols are 2,2-bis-(4-hydroxyphenyl)-propane, 2,4-bis-(4-hydroxyphenyl)-2-methylbutane, 1,1-bis-(4-hydroxyphenyl)-p-diisopropyl-benzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl) sulphone, 2,4-bis-(3,5-dimethyl-4-hydroxyphenyl)-2-methylbutane, 1,1-bis-(3,5-dimethyl-4-hydroxenyl)-p-diisopropyl-benzene 2,2-bis-(3,5-dichloro-4-hydroxyphenyl)-propane, 2,2-bis-(3,5-dibromo-4-hydroxyphenyl)-propane and 1,1-bis(4-hydroxyphenyl)-3,3,5-trimethylcyclohexane.

Particularly preferred diphenols are 4,4'-dihydroxyphenyl, 4,4'-dihydroxyphenyl sulphide, 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 1,1-bis-(4-hydroxyphenyl)-3,3,5-trimethylcyclohexane.

Suitable chain-branchers for the process according to the invention are 3-functional and higher-functional compounds suitable for the preparation of polycarbonates, preferably those with 3 or more than 3 phenolic OH groups.

Examples of suitable chain-branchers are phloroglucinol, 4,6-dimethyl-2,4,6-tri-(4-hydroxyphenyl)-heptene-2, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis-(4-hydroxyphenyl)-cyclohexyl)]-propane, 2,4-bis-(4-hydroxenyl-isopropyl)-phenol, 2,6-bis-(2-hydroxy-5'-methyl-benzyl)-4-methylphenol, 2-(4-hydroxyphenyl)-2-(2,4-dihydroxyphenyl)-propane, hexa-(4-(4-hydroxyphenyl-isopropyl)-phenyl)-orthoterephthalate, tetra-(4-hydroxyphenyl)-methane, tetra-(4-(4-hydroxyphenyl-isopropyl)-phenoxy)-methane, 1,4-bis-(4,4-dihydroxytriphenyl)-methyl)-benzene and in particular a,a',a"-tris-(4-hydroxyphenyl)-1,3,4-triisoprenylbenzene. Other possible chain-branchers are 2,4-dihydroxybenzoic acid, trimesic acid, cyanuric chloride and 3,3-bis-(3-methyl-4-hydroxyphenyl)-2-oxo-2,3-dihydroindole.

The optionally used chain-branchers are used in amounts of 0.05 to 2 mol-%, relative to the moles of diphenols used. They are reacted together with the diphenols in the process according to the invention.

Suitable dicarbonates for the process according to the invention ar diaryl carboxylates.

Diphenyl carbonate, as described in the examples, is particularly preferred as a dicarbonate.

Relative to 1 mole of bisphenol, the dicarbonates are used in amounts of 1.01 to 1.30 moles, preferably 1.02 to 1.15 moles.

The process according to the invention is performed in such a way that in the first step melting of the diphenols and the dicarbonates and optionally the chain-brancher is performed at temperatures of 80° C. to 250° C., preferably 100° C. to 230° C., particularly preferably 120° C. to 190° C., at atmospheric pressure over 0.1 to 5 hours, preferably 0.25 to 3 hours.

Then, by applying a vacuum and raising the temperature, the oligocarbonate is prepared from the aromatic dihydroxy compounds and the dicarbonate by distilling off the monophenol. In the last step, the polycarbonate is prepared by a polycondensation process by further increasing the temperature to 240 –320° C. and at a pressure of <2 mm Hg.

Reaction of the aromatic dihydroxy compound and the dicarbonate may, as described above, be performed in a continuous or a batch process.

The polycarbonates obtainable by the process according to the invention, are homopolycarbonates or copolycarbonates or even mixtures of polycarbonates. They have mean molecular weights $M_W$ (determined by measuring the relative viscosity of a solution in $CH_2Cl_2$ or in mixtures of equal amounts by weight of phenol and o-dichloro-benzene or by light scattering) of 15 000 to 200 000, preferably 19 000 to 60 000.

The molecular weight may be restricted on the one hand by the amount of dicarbonate and by the temperature and pressure at which the reaction is performed, but on the other hand also by the addition of monophenols, for example alkylphenols, as is described for example in EP-A 0 360 578.

Auxiliary and reinforcing substances may be mixed with the polycarbonate prepared according to the invention in order to improve the properties. As such, among others, the following may be considered: stabilisers, flow-control agents, mould release agents, fire protection agents, pigments, finely divided minerals and fibres, e.g. alkyl and aryl phosphites, phosphates, phosphines, lower carboxylates, halogenated compounds, salts, chalk, quartz powder and glass and plastic fibres.

Furthermore, the polycarbonates according to the invention may also be mixed with other polymers, e.g. polyolefins, polyurethanes or polystyrenes.

The addition of these substances takes place preferably in conventional units using the finished polycarbonate, but may also, depending on the requirements, take place during one of the other steps in the process according to the invention.

In addition, it is also possible, for particular applications, to modify the polycarbonates by co-condensing blocks, segments and co-monomers, e.g. siloxane blocks with terminal OH groups, aromatic and aliphatic polyesters with terminal OH and carboxylic acid groups, polyphenylene sulphide blocks with terminal OH groups and polyphenylene oxide blocks with terminal OH groups.

The polycarbonates obtainable by the process according to the invention are, in the same way as the known commercially obtainable polycarbonates, processable to give any moulded parts in well-known ways, thus for example to make sheets, window sheeting or films. The polycarbonates obtainable by the process according to the invention and the moulded items produced from them, are usable in well-known ways in optics, in electrical engineering, in the automobile sector and in the building sector.

EXAMPLES

EXAMPLE 1

114.15 g (0.500 mol) of bisphenol A and 113.54 g (0.530 mol) of diphenyl carbonate are weighed into a 500 ml three-necked flask with stirrer internal thermometer and Vigreux column (30 cm, metal coated) with bridges. The apparatus is cleared of atmospheric oxygen by the application of a vacuum and rinsing with nitrogen (3 times) and the mixture is heated to 150° C. 0.00175 g ($2*10^{-3}$ mol-% relative to bisphenol A) of $BaF_2$ as a 0.1% strength aqueous solution are then added and the phenol produced is distilled off at 100 mbar. At the same time, the temperature is raised to 250° C. After 1 hour the pressure is reduced to 1 mbar. Polycondensation is achieved by lowering the pressure to 0.5 mbar and raising the temperature to 280° C. A pale-coloured, solvent-free polycarbonate with a relative viscosity in solution of 1.289 (dichloromethane, 25° C., 5 g/l) is obtained.

EXAMPLE 2

As in example 1, but using 0.0015 g of CsF ($2*10^{-3}$ mol-%) in a 0.1% strength aqueous solution. A pale-coloured, solvent-free polycarbonate with a relative viscosity in solution of 1.337 (dichloromethane, 25° C., 5 g/l) is obtained.

EXAMPLE 3

As in example 1, but using 0.00058 g of KF ($2*10^{-3}$ mol-%) in a 0.1% strength aqueous solution. A pale-coloured, solvent-free polycarbonate with a relative viscosity in solution of 1.398 (dichloromethane, 25° C., 5 g/l) is obtained.

EXAMPLE 4

As in example 1, but using 0.00042 g of NaF ($2*10^{-3}$ mol-%) in a 0.1% strength aqueous solution. A pale-coloured, solvent-free polycarbonate with a relative viscosity in solution of 1.277 (dichloromethane, 25° C., 5 g/l) was obtained.

EXAMPLE 5

As in example 1, but using 0.00164 g of $N(CH_3)_4F$ ($5*10^{-3}$ mol-%) in a 0.1% strength aqueous solution. A pale-coloured, solvent-free polycarbonate with a relative viscosity of 1.236 (dichloromethane, 25° C., 5 g/l) is obtained.

EXAMPLE 6

As in example 1, but using 0.000656 g of $N(CH_3)_4F$ ($2*10^{-3}$ mol-%) in a 0.1% aqueous solution and 0.00058 g of KF ($2*10^{-3}$ mol-%) in a 0.1% strength aqueous solution. A pale-coloured, solvent-free polycarbonate with a relative viscosity in solution of 1.336 (dichloromethane, 25° C., 5 g/l) is obtained.

EXAMPLE 7

As in example 1, but using 0.00492 g of $PbF_2$ ($4*10^{-3}$ mol-%) in a 0.1% strength aqueous solution. A pale-coloured, solvent-free polycarbonate with a relative viscosity in solution of 1.278 (dichloromethane, 25° C., 5 g/l) is obtained.

EXAMPLE 8

As in example 1, but using 0.0358 g of $PPh_4F$ ($2*10^{-3}$ mol-%) in a 0.1% strength aqueous solution. A pale-coloured solvent-free polycarbonate with a relative viscosity in solution of 1.33 (dichloromethane, 25° C., 5 g/l).

Comparison Example

As in example 1, but no catalyst is used. An oligocarbonate with a relative viscosity in solution of 1.090 (dichloromethane, 25° C., 5 g/l) is obtained.

EXAMPLE 9

5 130 g (22.5 mol) of bisphenol A, 5 152 g (24.075 mol) of diphenyl carbonate and 75.6 mg of sodium fluoride ($8*10^{-3}$ mol-%) as a 1% strength aqueous solution are weighed into a 25 l stirred container. The container is rendered inert with nitrogen and the raw materials are heated to 180° C. over 15 minutes. When the molten material reaches a temperature of 100° C., the stirrer is switched on and the pressure is reduced to 100 mbar. The temperature is held at 180° C. for one hour and the phenol released is distilled off via a condenser. The temperature is raised to 240° C. over a further hour and then the pressure is reduced further to bar for 30 minutes. After increasing the temperature of the molten material to 290° C., polycondensation is performed under high vacuum (1 mbar) for two hours and then the polycondensation is taken to its conclusion in one hour at 310° C. After flushing out with nitrogen, the polycarbonate is removed from the vessel and granulated. The relative viscosity in solution of the isolated polycarbonate is 1.300 (dichloromethane, 25° C., 5 g/l).

EXAMPLE 10

As example 9, but using 125.6 mg of $N(CH_3)_4F$ ($6*10^{-3}$ mol-%) instead of the sodium fluoride as a 1% strength aqueous solution. The relative viscosity of the isolated polycarbonate is 1.294 (dichloromethane, 25° C., 5 g/l).

EXAMPLE 11

As example 9, but using 322.2 mg $PPh_4F$ ($4*10^{-10-3}$ mol-%) instead of the sodium fluoride as a 1% strength aqueous solution. The relative viscosity in solution of the isolated polycarbonate is 1.283 (dichloromethane, 25° C., 5 g/l).

EXAMPLE 12

As example 9, but using 157.5 mg of $BaF_2$ ($4*10^{-3}$ mol-%) instead of the sodium fluoride as a 1% strength aqueous solution. The relative viscosity in solution of the isolated polycarbonate is 1.304 (dichloromethane, 25° C., 5 g/l).

EXAMPLE 13 (Comparison Example)

As example 9, but using 29 mg of sodium phenolate ($1.14*10^{-3}$ mol-%) instead of the sodium fluoride as a 1% strength aqueous solution. The relative viscosity in solution of the isolated polycarbonate is 1.276 (dichloromethane, 25° C., 5 g/l).

EXAMPLE 14 (Comparison Example)

As example 9, but using 58 mg of sodium phenolate ($2.28*10^{-3}$ mol-%) instead of the sodium fluoride as a 1% strength aqueous solution. The relative viscosity in solution of the isolated polycarbonate is 1.288 (dichloromethane, 25° C., 5 g/l).

EXAMPLE 15 As Proof of the Improved Hydrolytic Stability:

To determine the resistance to hydrolysis, the PC granulates isolated in examples 9 to 14 are stored in water which is boiling under reflux at 100° C. The relative viscosities in solution are determined after 100, 200 and 300 hours. The results ar given in the following Table.

|  | Initial value $eta_{rel}$ | $eta_{rel}$ 100 h | $eta_{rel}$ 200 h | $eta_{rel}$ 300 h | $\Delta eta_{rel}$ |
| --- | --- | --- | --- | --- | --- |
| PC from example 9 | 1.300 | 1.294 | 1.290 | 1.283 | 0.017 |
| PC from example 10 | 1.294 | 1.286 | 1.281 | 1.276 | 0.018 |
| PC from example 11 | 1.283 | 1.278 | 1.271 | 1.266 | 0.017 |
| PC from example 12 | 1.304 | 1.296 | 1.290 | 1.285 | 0.019 |
| PC from example 13 | 1.276 | 1.260 | 1.254 | 1.248 | 0.028 |
| PC from example 14 | 1.288 | 1.270 | 1.261 | 1.252 | 0.036 |

We claim:

1. A process for the preparation of an aromatic polycarbonate in the molten state comprising reacting at least one aromatic dihydroxy compound with a diaryl carbonate in the presence of a catalyst conforming to $$M^+F_x^-$$

wherein $M^+$ is a member selected from the group consisting of $Na^+, K^+, Rb^+, Cs^+, Ca^{2+}, Ba^{2+}, Sr^{2+}$, a quarternary ammonium ion and a quaternary phosphonium ion and where x is the valence of said member.

2. The process of claim 1 wherein said $M^+$ is selected from the group consisting of $Na^+, K^+, Rb^+, Cs^+, Ca^{2+}, Ba^{2+}$ and $Sr^{2+}$.

3. The process of claim 1 wherein said $M^+$ is $Ba^{2+}$.

4. The process of claim 1 wherein said $M^+$ is $(N(CH_3)_4^+)$.

5. The process of claim 1 wherein said $M^+$ is $P(C_6H_5)_4^+$.

6. The process according to claim 1, wherein the catalyst is present in amounts of $10^{-8}$ mol to $10^{-1}$ mol of diphenol.

7. The process according to claim 1, wherein the catalyst is present in the molten stain amount of $10^{-7}$ mol to $10^{-2}$ mol per mol of diphenol.

8. A process for the preparation of an aromatic polycarbonate in the molten state comprising reacting at least one aromatic dihydroxy compound with a diaryl carbonate int eh presence of a catalyst conforming to $$M^+F_x^-$$

wherein $M^+$ is selected from the group consisting of $N(CH_3)_4^+$ and $P(C_6H_5)_4^+$.

9. A process for the preparation of an aromatic polycarbonate in the molten state comprising reacting at least one aromatic dihydroxy compound with a diaryl carbonate in the presence of a catalyst conforming to $$M^+F_x^-$$

wherein $M^+$ is $N(CH_3)_4^+$.

10. A process for the preparation of an aromatic polycarbonate in the molten state comprising reacting at least one aromatic dihydroxy compound with a diaryl carbonate in the presence of a catalyst conforming to $$M^+F_x^-$$

wherein $M^+$ is $P(C_6H_5)_4^+$.

* * * * *